Feb. 7, 1967 H. P. LUDWIG 3,302,244
APPARATUS FOR THE INJECTION MOLDING OF ARTICLES
MADE OF PLASTIC, ESPECIALLY FOOTWEAR
Filed April 16, 1964 2 Sheets-Sheet 1
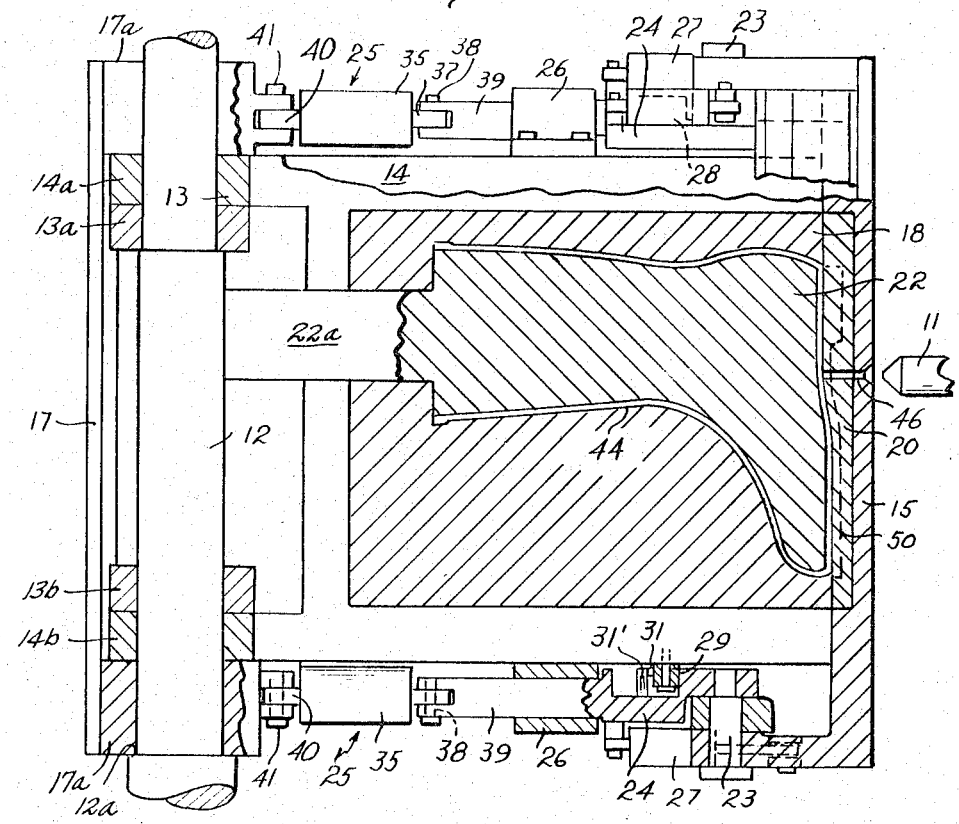
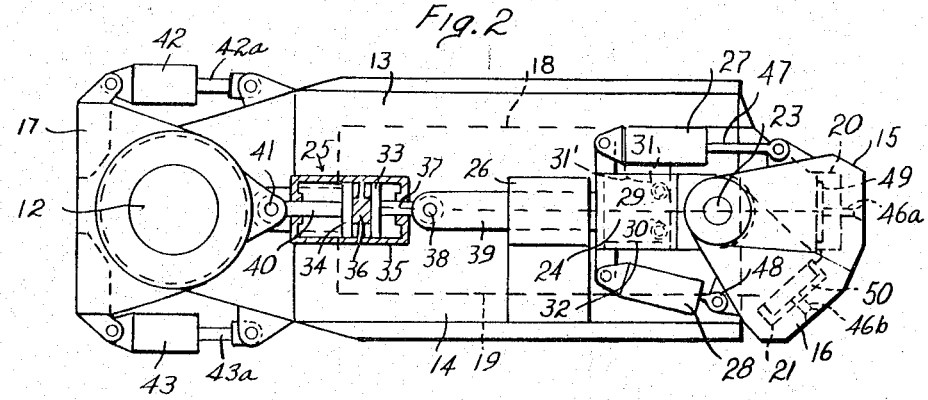

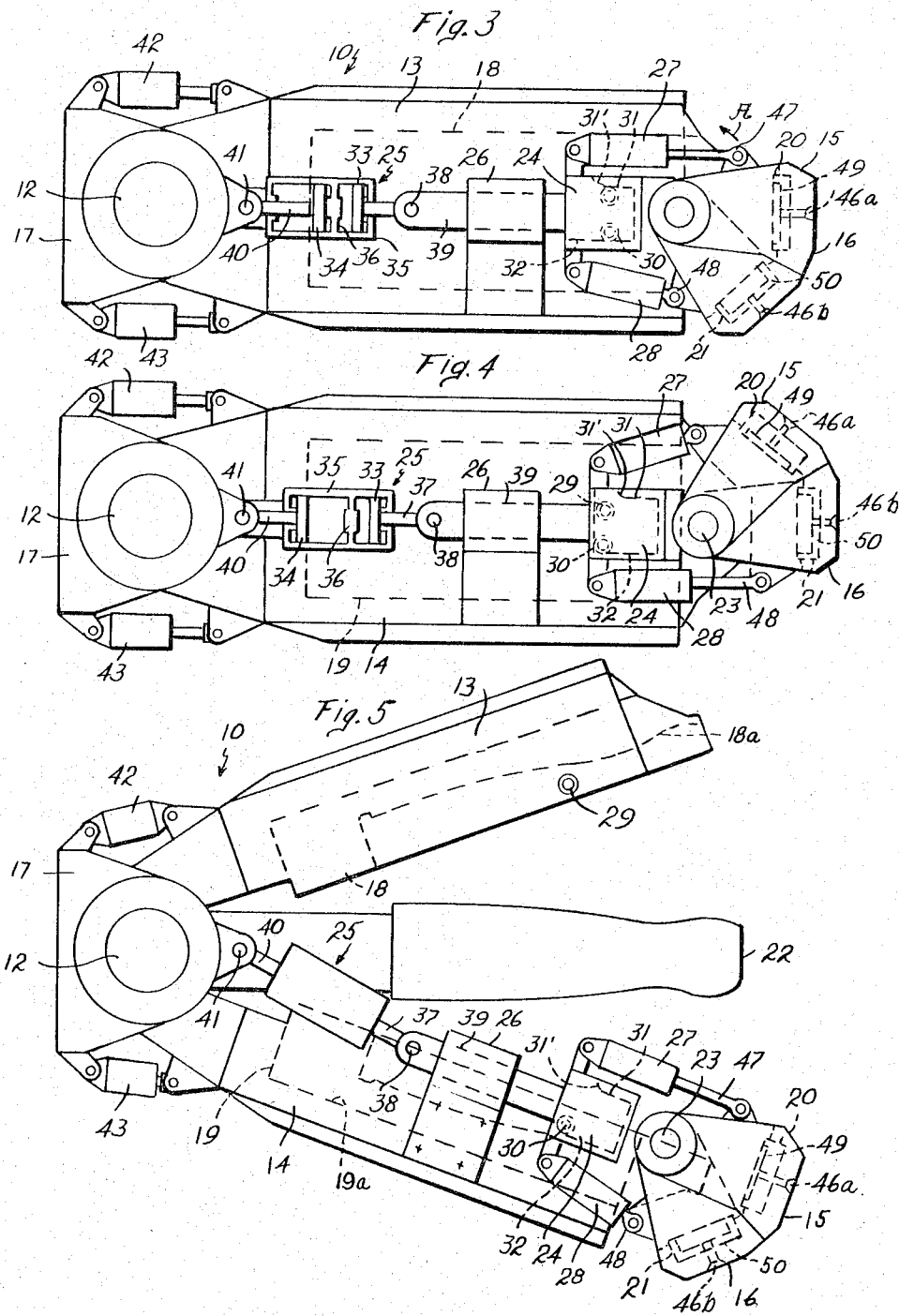

United States Patent Office 3,302,244
Patented Feb. 7, 1967

3,302,244
APPARATUS FOR THE INJECTION MOLDING OF ARTICLES MADE OF PLASTIC, ESPECIALLY FOOTWEAR
Herbert P. Ludwig, Desmastr. 112, Uesen, near Bremen, Germany
Filed Apr. 16, 1964, Ser. No. 360,365
12 Claims. (Cl. 18—30)

This invention relates to apparatus for injection molding of hollow plastic articles and especially to injection molding apparatus of the kind embodying an outer mold within which a form or inner mold part is completely enclosed, the outer and inner parts providing a mold cavity of the shape of the article to be formed into which plastic material is injected through an injection passage in the outer mold part. Molding apparatus of this kind is used to make plastic footwear wherein the upper and bottom are integral and entirely comprised of plastic.

It is sometimes desirable to form the bottom of such footwear of two or more layers of plastic of the same or different kind and/or color, and heretofore this has been achieved by placing an insert in the bottom of the bottom-forming part of the mold cavity, injecting a first layer, removing the insert and injecting a second layer. Inserting and removing the insert from the bottom mold after each injection requires opening and closing the mold and this is difficult and time consuming. It is accordingly the purpose of this invention to eliminate the disadvantages of the current apparatus by providing an apparatus which enables forming bottoms comprised of two layers of plastic of the same or different kind and/or color by double injection without need for an insert and rapidly enough to insure high productive capacity.

As herein illustrated, a plurality of mold assemblies, each a complete operating unit in itself, are mounted on a turret-like support for movement about a common center relative to one or more injection heads disposed about the center, each of which is supplied with plastic compound of a different kind and/or color, so that by aligning a mold assembly with an injection head, plastic of the kind supplied thereto may be injected into the mold. Each mold assembly comprises a support adapted to be attached to the turret and a form fixed to the support in a substantially horizontal position and extending radially outwardly therefrom with respect to the axis of rotation of the turret with the median line at the bottom, when the form is a last, parallel to the axis of rotation. A pair of side mold parts are mounted with one end of each on the support and one at each side of the form for movement toward each other into engagement about the sides of the form. Each mold part contains a recess and these recesses collectively form a cavity around the form for receiving an injection of plastic compound. A pair of end mold parts are mounted at the distal end of one of the side mold parts for angular movement with the side mold part about its axis of rotation and on the side mold part for rotation about an axis parallel to the axis of rotation of the side mold part. Each end mold part contains a cavity, the cavity in one being deeper than that in the other and these are alternately movable into a position opposite the end of the form when the side mold parts are moved into engagement to provide for a first mold cavity of shallow depth to receive a first injection in conjunction with injection of the upper into the mold cavity provided by the side mold parts, and then to superimpose a second injection at the bottom of the first injection. There is power-operable means on one of the side mold parts connected to the end mold parts which is operable to move one or the other into a position opposite the ends of the side mold parts when the latter are engaged, and power-operable means operable to effect radial movement of the end mold part that is opposite the ends of the side mold parts when the latter are engaged to bring the end mold part into engagement with the ends of the side mold parts. The power-operable means for effecting radial movement of the end mold part is operative through a first displacement of the end mold part to disengage it from the ends of the side mold parts without releasing the locking means to enable moving the alternate end mold parts into position without opening the side mold parts, and following the second injection a further distance to release the locking means to enable moving the side mold parts away from each other so that the finished article may be removed from the form. Power-operable means is also mounted on the support and connected to the side mold parts for moving them into and out of engagement about the form.

The invention will now be described in greater detail with reference to the accompanying drawings wherein:

FIG. 1 is an elevation of a single mold assembly with parts in section;

FIG. 2 is a plan view of the mold assembly in injection position showing some parts in horizontal section;

FIG. 3 is a plan view of the mold assembly with the end mold parts disengaged from the side mold parts sufficiently to permit rotating them alternately into operative position, but without unlocking the side mold parts;

FIG. 4 is a plan view of the mold assembly with the end mold parts moved far enough away from the ends of the side mold parts to unlock the latter and permit their separation; and FIG. 5 is a plan view of the mold assembly with the side mold parts moved away from each other to provide access to the form.

Referring to the drawings (FIG. 1) there is shown a single post 12 of a series of posts mounted vertically on a turret (not shown herein) designed to rotate about a vertical axis for movement of a corresponding number of mold assemblies, one of which is shown herein supported by the post 12, relative to an injection nozzle 11. A fragmentary portion of one of the nozzles 11 is shown spaced radially from the axis of rotation of the turret to enable rotating successive mold assemblies relative thereto to dispose one after another in a position for engagement with the nozzle for injection of a plastic compound. Several nozzles may be provided for supplying plastic compound of different kind and/or color.

On each post 12 there is mounted a bracket 17 having vertically spaced bearings 17a and 17b embracing the post, the lower one resting on a shoulder 12b; and two side mold carriers 13 and 14, each of which is provided with upper and lower bearings 13a, 13b and 14a, 14b rotatably mounted on the post 12 with the upper bearings 13a, 14a resting on a shoulder 12b on the shaft 12. The side mold carriers 13, 14 are movable angularly about the axis of the post 12 toward and away from each other; toward each other to move a pair of side mold parts 18, 19 together to form a mold cavity 44 about a form 22 mounted in a horizontal position on the post 12 and extending radially therefrom between the side mold carriers on a neck 22a. The side mold parts 18 and 19 are removably secured to the side mold carriers and contain recesses 18a and 19a which collectively form, in conjunction with the exterior surface of the form 22, the cavity 44 for receiving a charge of plastic compound to form the upper of the article of footwear which is to be manufactured. The meeting or confronting faces of the mold parts 18 and 19 lie in a plane substantially perpendicular to the bottom of the last which contains the median line of the bottom and the axis of the post or shaft 12. Correspondingly, the meeting or confronting surfaces of the carriers 13 and 14 lie in the same plane.

The form herein illustrated is a last embodying a leg portion and foot and is mounted on the post with the bottom of the foot portion and its median line substantially parallel to the axis of the shaft 12.

End or bottom mold parts 20, 21 for forming a bottom or sole to the upper and to enable forming the bottom in two layers are provided supported by end mold carriers 15 and 16 at the distal end of one of the side mold carriers, as shown herein side mold carrier 14, for pivotal movement on an axis parallel to the axis of the post 12 and for radial movement relative to the axis of the shaft 12 to enable moving the end mold carriers and hence the end mold parts alternately into and out of operative position with respect to the side mold parts. Radial movement is provided by spaced parallel bars 39 slidably supported in brackets 26 (FIGS. 1 and 2) fastened to the opposite edges of the side mold carrier 14. Pins 23 at the forward ends of the bars 39 pivotally support the end mold carriers and they in turn support the end mold parts 20 and 21 which are removably mounted therein. The end mold part 21 contains a cavity 50 which is deeper than the cavity 49 of the end mold part 20. When either of the end mold parts is moved into position opposite the ends of the side mold parts, and in confronting relation to the distal end of the form, it provides a cavity at the end of the form for receiving an injection of plastic compound. By moving the end mold carrier 15 with the end mold part 20 with its cavity 49 into position first and making an injection which fills the cavity 44 and the cavity 49, and then moving the end mold carrier 15 away from the end of the form and moving the end mold carrier 15 into position to place the end mold 21 with its cavity 50 opposite the bottom of the form, a second layer of plastic composition may be injected into the cavity 50 over the first layer.

The end mold carriers 15 and 16 are moved into and out of operative position about the axes of the pins 23 by power-operable means in the form of cylinders 27 and 28 containing pistons and rods 47, 48. The cylinders 27 and 28 are pivotally connected at one end to the opposite ends of blocks 24 fastened transversely to the bars 39 and pivotally connected at their opposite ends to the respective end mold carriers 15 and 16. Radial movement of the bars 39 and hence of the end mold carriers 15 and 16 is provided by power-operable means 25 in the form of cylinders 35 each containing two pistons 33 and 34 and two rods 37 and 40 projecting from their opposite ends. The projecting ends of the rods 37 are pivotally connected by pins 38 to the rear ends of the bars 39 and the projecting ends of the rods 40 are pivotally connected by pins 41 to the bearings 17a.

In operation it is desirable to be able to move the end mold parts away from the side mold parts to enable swinging the end mold part used first out of position and the other into position without releasing the side mold parts. To this end there are secured to the inner sides of the bars 39 (FIG. 1) spaced parallel cam bars 31 and 32 having confronting cam surfaces parallel to the direction of movement of the bars 39. The cam bar 32 is longer than the cam bar 31. Cam rollers 29 and 30 are mounted on the respective side mold carriers 13 and 14 for engagement by the cam bars 31 and 32 as the bars 39 are moved radially. When both of the cam rollers are engaged between the cam bars the side mold carriers are locked together and cannot be swung apart. When disengaged the side mold carriers may be moved away from each other to provide access to the form or last situated between them to enable removing the finished article of footwear. Cam rollers 29, 30 are so positioned that the cam bars may be moved radially from the position shown in FIG. 2, in which the cam rollers abut the bottom or lower ends of the cam surfaces radially outward, to the position shown in FIG. 3 in which the cam rollers are spaced from the bottom nearly but not quite clearing the end of the shortest one of the cam bars 31. Displacement of the bars 39 this amount provides clearance between the end mold carriers 15, 16 and the distal ends of the side mold carriers 13, 14, which enables rotating the end mold carriers 15, 16 relative to the distal ends of the side mold carriers 13, 14, but without unlocking the side mold carriers. Further movement beyond this position as shown in FIG. 5 clears the cam rollers 29 from the cam bars 31 thus allowing the side mold carriers to be separated from each other as shown in FIG. 5.

Movement of the bars 39 to effect displacement of the end mold carrier to the first position to free the end mold carriers and thereafter to the second position to unlock the side mold carriers is afforded by power-operable means 25, which, as related above, comprises cylinders 35 having interior partitions 36 between their opposite ends. The pistons 33 and 34 in each cylinder 35 are double-acting so that it is possible by movement of the piston 33 toward the right without the pistons 34 being moved, to move the bars 39 through a first distance to clear the end mold parts of the side mold parts and then by movement of the cylinders 35 relative to the pistons 34 without the pistons 33 being moved to extend the bars 39 the further distances necessary to clear the locking means, that is the cam bars from the cam rollers, so that the side mold parts may be separated.

Finally, there are power-operable means in the form of cylinders 42, 43 pivotally connected at one end to the bearings 17a and provided with rods 42a, 43a at their other ends pivotally connected to the side mold carriers 13, 14 for effecting movement of the side mold carriers 13 and 14 toward or away from the core.

The apparatus operates as follows: For the injection molding of, for example, two-color footwear with a black upper and red sole, closed mold carrier, as shown in FIGS. 1 and 2, will be brought in front of a first injection head 11 containing a black compound.

The end mold carrier 15 holds the side mold carriers 13 and 14 locked in engagement with each other so that within the composite carrier comprising the parts 13, 14 and 15, there is a mold cavity 44 around the side of the last and a mold cavity 49 at the end of the last, the two cavities being of approximately corresponding thickness and preferably of a thickness suitable for the formation of the upper material of the article of footwear being manufactured. Injection of the black plastic compound is effected through a passage 46a provided in the end mold carrier 15 and through the mold 20 into the cavity 49 therein, and from thence into the mold cavity 44. When the black upper and inner bottom has been injected and formed, the mold carrier and first injection head will be separated whereupon the pistons 33 will be moved to the right by supplying pressure to their left-hand sides to force the bars 39 and hence the end mold carriers 15 and 16 radially away from the distal end of the side mold carriers, to the position shown in FIG. 4 where they may be swung relative to the ends of the side mold carriers about the axes of the pins 23 parallel to the axis of the shaft 12. The side mold carriers 13 and 14 remain locked since in the position illustrated in FIG. 3 the cam bars 31 and 32 still engage the cam rollers 29 and 30. Pressure is now supplied to the pistons 27, 28 which are also double-acting to cause the piston rods 47 connected to the end mold carrier 15 to swing the latter in the direction of the arrow A away from the ends of the side mold carrier and to cause the rods 48 connected to the end mold carrier 16 to swing the latter in the direction of the arrow A into a position opposite the end of the side mold carriers. Now pressure will be supplied to the right sides of the pistons 33 to retract the bars 39 and hence the end mold carrier 16 into engagement with the ends of the side mold carrier to hold the side mold parts tightly engaged with the end mold part 21 opposite the end of the form.

The end mold part 21, as related above, has a mold cavity 50 deeper than that of the end mold part 20, so that if it is moved to a position opposite the end of the form in place of the end mold part 20 a cavity 50 is provided opposite the previously injected bottom layer of black plastic compound which was injected to form the upper and first layer of the bottom. If now the mold carrier is moved in front of the second injection head (not shown) that contains a red plastic compound the latter may now be injected through an injection passage 46a to fill the cavity 50 and thus to apply a second layer constituting an outer layer to the end of the form over the first layer. After the second injection is finished and the mold carrier is separated from the injection head, the mold carrier is opened to permit the finished article of footwear to be removed. For this purpose the pistons 33, 34 will be supplied with pressure so that the pistons 33 will move to the right and the pistons 34 in relation to the cylinder 35 inside of the cylinders will be moved to the left. The combined movement extends the bars 39 to clear the cams 31 and 32 of the cam rolls 29 and 30 and so not only to displace the end mold carriers from the ends of the side mold carriers, but also to release the side mold carriers from each other whereupon they may be moved, that is swung away from each other, as shown in FIG. 5, to expose the form.

The cam 31 has at its front edge a beveled surface 31' so that during closing of the side mold carriers and locking of the same through movement to the left, the parts may be forced tightly into engagement with each other.

The end mold carriers 15 and 16 may be moved separately by their drives 27 and 28 so that it is possible to move both horizonally outward to provide access to the bottom cavity or to the first bottom layer without having to open the side mold parts 18 and 19. Access is thus possible to the partly finished article, for instance to the first layer of the bottom in order to perform some work, possibly to apply a solution which will result in better adhesion of the second layer thereto prior to injection of the second layer.

The end mold carriers 15 and 16 do not lock the side mold carriers hence they need not be made massive and it will thus be possible to employ shorter injection passages. This has the advantage that the plastic compound does not become too cool before it reaches the cavity and there will be less loss of material in the injection passages. Because of the small mass of the end mold carriers no heating is required, they require little space so that the mold carrier can be kept compact, and they can be turned on a relatively small diameter so that the turntable itself may be of relatively small diameter. The whole apparatus may be worked automatically in a very simple manner by having its drive automatically controlled.

The invention here illustrated constitutes a modification of the invention illustrated in my copending application of even date.

It should be understood that the present disclosure is for the purpose of illustration only and that this invention includes all modifications and equivalents which fall within the scope of the appended claims.

I claim:

1. Apparatus for injection molding comprising a form having sides and a bottom corresponding in shape to the shoe to be made, side mold parts movable about the sides of the form to form, in conjunction with the sides, a cavity, the thickness of which corresponds to the thickness of the upper of the shoe to be made, bottom mold parts alternately movable into a position opposite the bottom of the form to form, in conjunction with the bottom, a cavity at the bottom which is in communication with the cavity at the sides, one of said bottom mold parts forming a cavity between it and the bottom of the form of predetermined depth and the other a greater depth, means supporting the bottom mold parts for linear and pivotal movement relative to the side mold parts, power-operable means connected to the last-named means operative to effect linear movement, on the one hand to hold a bottom part engaged with the side parts opposite the bottom of the form and on the other hand to hold it disengaged therefrom, and other power-operable means connected to the bottom parts operable to effect pivotal movement of the bottom parts, when they are disengaged from the side parts, to move one or the other into operative position opposite the bottom of the form.

2. Apparatus for molding comprising a form having a top, sides and bottom, a support supporting the form from the top, side mold parts pivotally mounted on the support for movement about the sides of the form into engagement with each other to form, in conjunction with the sides of the form, a cavity, the thickness of which corresponds to the thickness of the upper of the shoe to be made, members supported by one of the side mold parts for linear movement heightwise of the form, a pair of bottom mold parts pivotally mounted on said members for movement of one or the other to a position opposite the distal ends of said side mold parts and the bottom of the form to provide a cavity at the bottom of the form which is in communication with the cavity at the sides of the form, power-operable means mounted on said members and connected to the bottom mold parts operative to move one or the other into confronting relation to the bottom of the form, and other power-operable means connected to said members operative to effect movement thereof in said heightwise direction to draw the bottom mold part confronting the bottom of the form into engagement with the distal ends of the side mold parts.

3. Molding apparatus comprising a form having a top, sides and a bottom, a support supporting the form from the top, side molds parts mounted on the support for pivotal movement about an axis parallel to the heel-to-toe median of the form, said side mold parts having faces adapted to meet in a median plane substantially perpendicular to the bottom of the form, a member mounted at each end of one of the side mold parts, movable lengthwise thereof parallel to said surface, a pair of bottom mold parts pivotally mounted between the members at the distal ends of the side mold parts, swingable about an axis lying in the median plane, for movement of one or the other into a position opposite the distal ends of the side mold parts when the side mold parts are engaged, means connected to the bottom mold parts to effect pivotal movement thereof, and means connected to said members operative to effect lengthwise movement of the side mold parts to draw the bottom mold part opposite the distal ends of the side mold parts into engagement therewith.

4. Molding apparatus comprising a form having a top, sides and a bottom, a support, a pair of side mold parts, means pivotally mounting the side mold parts on the support for movement about an axis situated in a median plane perpendicular to the bottom of the form so that the side mold parts meet in said median plane, means operatively connected to the side mold parts operable to swing the side mold parts into and out of engagement relative to the form, a pair of bottom mold parts mounted on one of the side mold parts adjacent its distal end for angular movement about the axis of the first means toward and away from the distal end of the form and for pivotal movement about an axis parallel to said axis, means operatively connected to the bottom mold parts operable, when the side mold parts are engaged, to effect movement of one of the bottom mold parts in engagement with the distal ends of the side mold parts, to lock the side mold parts together, and other means operably connected to the bottom mold parts operable, when the latter are disengaged from the distal ends of the side mold parts, to swing one or the other into operative position.

5. A mold comprising a support, a shaft mounted on the support, a form having a top, side and bottom secured at its top to the shaft so as to extend radially outward with respect to the axis of the shaft, with the bottom spaced from and parallel to the axis of the shaft, a pair of side mold parts mounted on the shaft for pivotal movement about its axis into engagement with each other in a plane containing the axis of the shaft and the longitudinal median of the bottom, closing means connected to the support and to each side mold part operative to swing the side mold parts, relative to the axis of the shaft, to and from each other about the form, a pair of bars slidably mounted one at each end of one of the side mold parts for movement radially with respect to the axis of the shaft, a pair of bottom mold parts mounted on the bars for movement therewith to and from the distal end of the form, said bottom mold parts being pivotally mounted between the bars for movement about axes parallel to the axis of the shaft, means for effecting operation of the closing means, means for effecting pivotal movement of the bottom mold parts, when the side mold parts are engaged, to place one of the bottom mold parts opposite the bottom of the form, means for effecting linear movement of the slide bars to draw the bottom mold part opposite the distal ends of the side mold parts in engagement therewith, and locking elements on the bars and side mold parts engageable, by sliding movement of the bars, to lock the side mold parts together.

6. Apparatus for molding comprising a support, a shaft mounted on the support, a form having a top, side and bottom mounted at its top on the shaft substantially radially with respect to the axis thereof, with the bottom spaced from and parallel to the axis of the shaft, a pair of side mold parts mounted on the shaft for pivotal movement about its axis into engagement with each other in a plane containing the axis of the shaft and the longitudinal median of the bottom, means connected to the support and to each side mold part operable to swing the side mold parts, relative to said axis, to and from each other about the form, a bar slidably mounted at each end of one of the side mold parts for radial movement along the ends relative to the axis of the shaft, a pair of bottom mold parts mounted between the bars for movement therewith to and from the distal ends of the side mold parts, said bottom mold parts being pivotally mounted between the bars for movement about an axis parallel to the axis of the shaft, means for effecting movement of the side mold parts into engagement, means for effecting pivotal movement of the bottom mold parts to bring one of the bottom mold parts opposite the distal ends of the side mold parts when the latter are engaged, means for effecting linear movement of the bars to engage the bottom mold part opposite the distal ends of the side mold parts therewith, locking means on the bars and the side mold parts interengageable throughout a predetermined linear movement of the bars, and means operative to effect linear movement of the bars a predetermined first distance to disengage the bottom mold parts from the distal ends of the side mold parts to permit swinging the bottom mold parts without releasing the side mold parts and an additional distance to release the side mold parts.

7. A mold comprising a support, a shaft mounted on the support, a form having a top, sides and bottom mounted at its top on the shaft substantially radially with respect to the axis of the shaft, with the bottom spaced from and parallel to the axis of the shaft, a pair of side mold parts mounted on the shaft for pivotal movement about its axis into engagement with each other in a plane containing the axis of the shaft and the longitudinal median of the bottom, closing means connected to the support and to each side mold part operative to swing the side mold parts to and from each other about the form, bars slidably mounted on each end of one of the side mold parts for movement radially with respect to the axis of the shaft, a pair of bottom mold parts mounted between the slide bars for movement therewith to and from the distal ends of the side mold parts, said bottom mold parts being pivotally supported between the slide bars for rotation about an axis parallel to the axis of the shaft, means for effecting pivotal movement of the bottom mold parts to position one or the other opposite the distal ends of the side mold parts, means for effecting radial movement of the slide bars to engage the bottom mold part opposite the distal ends of the side mold parts therewith, locking means on the slide bars and the side mold parts interengageable by said radial movement of the slide bars, the length of engagement of the locking means being such that the bottom mold parts are disengageable from the distal ends of the side mold parts without disengagement of the locking means to permit swinging the bottom mold parts to position first one and then the other of the bottom mold parts opposite the bottom of the form for movement into engagement therewith.

8. A mold comprising a support, a shaft mounted on the support, a last secured at its neck to the shaft in a substantially radial position with respect to the axis of the shaft, with the bottom spaced from and parallel to the axis of the shaft, a pair of side mold parts mounted on the shaft for angular movement about its axis into engagement with each other in a plane containing the axis of the shaft on the longitudinal median of the bottom, closing means connected to the support and to each side mold part operative to swing the side mold parts to and from each other about the last, a bearing element secured to each end of one of the side mold parts, a bar slidably mounted on each bearing with one end extending toward the axis of the shaft and the other end toward the distal end of the side mold part, a pair of bottom mold parts pivotally mounted between the bars at the distal ends of the side mold parts for pivotal movement about an axis parallel to the axis of the shaft, means connected to the one side mold part and the bottom mold part operable to swing one of the bottom mold parts into a position opposite the distal end of the side mold parts when they are engaged, dual chamber motors having rods protruding from their ends, the rods at one end being connected to the support and at their other ends to the bars, means on the bars movable therewith into interlocking engagement with the side mold parts to hold the side mold parts together, means for supplying fluid pressure to the chambers at one end of the motors to displace the bars radially sufficiently to disengage the bottom mold part from the distal ends of the side mold parts without releasing the side mold parts, and means for supplying pressure fluid to the chambers at the other end of the motors to effect further movement of the slide bars to unlock the side mold parts to permit separation thereof.

9. Apparatus for injection molding, comprising a support, a form secured to the support, said form having sides and a bottom corresponding in shape to the shoe to be made, a pair of side mold carriers mounted on the support for closing about the sides of the form, said side mold carriers being adapted to receive side mold parts for movement therewith into positions to form with the sides of the form a mold cavity about the form, side mold parts mounted on said side mold carriers, a pair of bottom mold carriers pivotally mounted on one of the side mold carriers for movement of one or the other about the end of the form, said bottom mold carriers being adapted to receive bottom mold parts for movement of one or the other to form with the bottom of the form a mold cavity about the bottom which is in communication with the mold cavity about the sides, and bottom mold parts mounted on said bottom mold carriers, one of which forms with the bottom of the form a larger bottom cavity than the other.

10. Apparatus according to claim 9, wherein the side mold and bottom mold carriers are adapted to have mounted thereon mold parts of different size for cooperation with forms of different size mounted on the support.

11. Apparatus according to claim 9, wherein the bottom mold carriers are adapted to be moved away from the side mold carriers to remove the bottom mold part opposite the bottom of the form away from the bottom of the form without separation of the side mold carriers and the side mold parts from the sides of the form.

12. Apparatus according to claim 9, wherein the bottom mold carriers are adapted to be moved away from the side mold carriers to remove the bottom mold part opposite the bottom of the form away from the bottom of the form without separation of the side mold carriers and the side mold parts from the sides of the form, and for repositioning of the bottom mold carriers to bring the other bottom mold part into position opposite the bottom of the form.

References Cited by the Examiner
UNITED STATES PATENTS

| | | | |
|---|---|---|---|
| 3,128,505 | 4/1964 | Ludwig | 18—42 |
| 3,173,176 | 3/1965 | Kobayaski | 18—30 |

J. SPENCER OVERHOLSER, *Primary Examiner.*

W. L. McBAY, *Assistant Examiner.*